United States Patent [19]

Koper

[11] 4,311,290
[45] Jan. 19, 1982

[54] ARRESTMENT SYSTEM
[75] Inventor: Kenneth T. Koper, Hatfield, Pa.
[73] Assignee: The United States of America as represented by the Secretary of the Navy, Washington, D.C.
[21] Appl. No.: 90,205
[22] Filed: Nov. 1, 1979
[51] Int. Cl.³ .............................................. B64F 1/02
[52] U.S. Cl. .................................. 244/110 R; 244/115
[58] Field of Search ................. 244/110 R, 110 F, 63, 244/114 R, 115, 116, 137 R; 258/1.2, 1.8, 11–26; 114/261

[56] References Cited

U.S. PATENT DOCUMENTS

| | | | |
|---|---|---|---|
| 983,514 | 2/1911 | Palmer | 258/14 |
| 1,005,610 | 10/1911 | Creager | 258/11 |
| 1,011,733 | 12/1911 | Brown | 258/17 |
| 1,025,042 | 4/1912 | Adam | 258/17 |
| 1,383,595 | 7/1921 | Black | 244/110 F |
| 1,686,298 | 10/1928 | Uhl | 244/110 F |
| 1,735,385 | 11/1929 | Fisher | 244/1.2 |
| 1,756,747 | 4/1930 | Holland | 244/110 F |
| 1,842,432 | 1/1932 | Stanton | 244/110 F |
| 3,389,880 | 6/1968 | Ferguson | 244/137 R |
| 3,980,259 | 9/1976 | Greenhalgh et al. | 174/261 |

FOREIGN PATENT DOCUMENTS 565084   10/1944   United Kingdom ............. 244/110 R

*Primary Examiner*—Galen L. Barefoot
*Attorney, Agent, or Firm*—R. S. Sciascia; Henry Hansen; Stanton D. Weinstein

[57] ABSTRACT

Apparatus and method for recovering and arresting an aircraft or other vehicle. A boom is swivelly connected to a support structure via braking mechanism. The boom is pivotally connected to the brake mechanism such that it can also pivot in a second, different plane intersecting the plane of rotation of the brake mechanism. A shear pin prevents pivoting of the boom in the second plane until the boom has experienced a predetermined load in that plane. The distal end of the boom distant from the brake mechanism is provided with structure for engaging the aircraft. When the aircraft is flown at and captured by the boom, the weight and motion of the aircraft breaks the shear pin, causing the boom to move in the second plane until engaged by a stop. This rapid change in position of the engaging end of the boom in the second plane prevents the aircraft from pendulating about the boom. Forward motion of the aircraft also causes movement within the brake mechanism in the first plane which absorbs the kinetic energy of the aircraft as the boom swivels against the brake mechanism, so that the aircraft is slowed and arrested.

9 Claims, 8 Drawing Figures

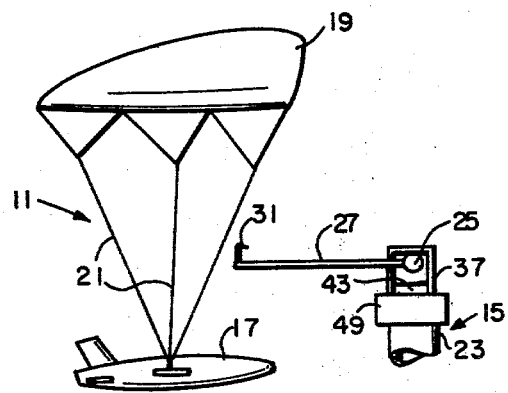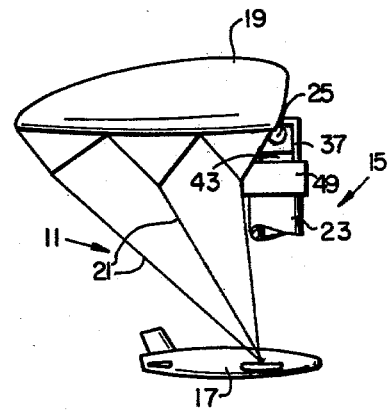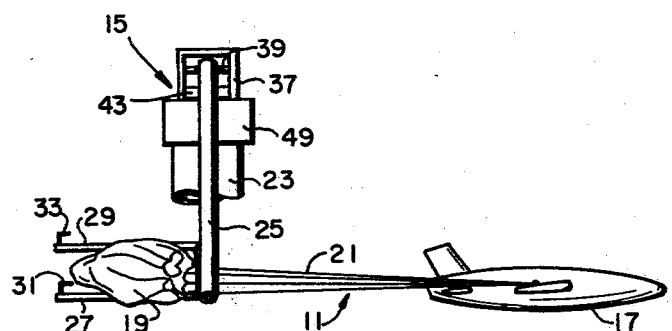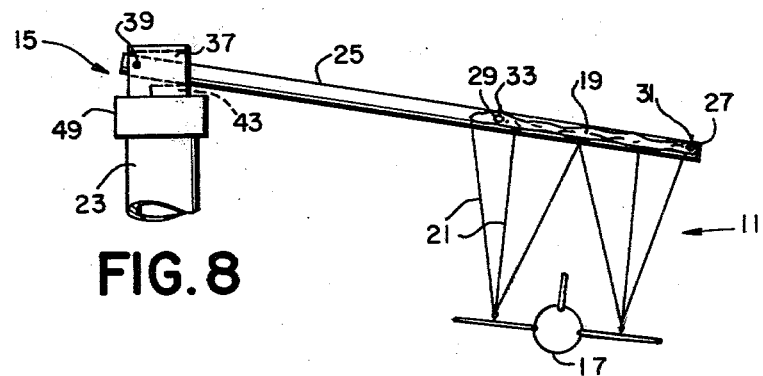

ARRESTMENT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to retarding and restraining devices and methods, and more particularly to devices and methods for arresting moving objects within a limited space.

Aircraft are frequently utilized in environments in which there is limited area available for recovery or arrestment of the aircraft, so that a normal landing is not feasible. For example, remotely piloted vehicles can be controlled from non-aviation ships which do not provide sufficient area for the vehicle to make a landing thereon. Thus, such vehicles often enter the water, especially while recovery is attempted, resulting in costly repairs or loss of the entire aircraft. Various devices have been utilized for landing fixed-wing aircraft within limited areas which include a cross arm or horizontal beam rotatably supported at its center or midpoint by a tower, and configured at one end to engage the flying aircraft. The use of a balanced cross arm, or of a single arm so rotatably supported near one end and provided there with a counterweight, or of a counterweight on a cross arm, permits the arm to remain in the same flat plane throughout its rotation, usually one perpendicular to the tower and parallel to sea level. Another such device for this purpose includes a single arm rotatably supported by a tower and whose outer end is gradually lowered to the ground as a fixed-wing aircraft captured and thereby connected thereto loses speed. While such devices have served the purpose, they have not proven entirely satisfactory because of the tendency of a flying aircraft, when engaged by an arm which is static with respect to the aircraft or moving more slowly than the aircraft, to swing or pendulate about that arm, which can cause damage to the aircraft and to any cargo or passengers disposed therein.

SUMMARY OF THE INVENTION

Accordingly, it is a general purpose of the present invention to provide apparatus and method capable of engaging a moving object and reducing its speed while preventing pendulation of the object upon capture thereof.

Other objects of the present invention are to provide apparatus and method for arrestment of a moving object which is capable of safely bringing the object to a halt without pendulation of or damage to the object.

Further objects of the present invention are to provide an arrestment system and method which is capable of dissipating the kinetic energy of a moving object and decelerating it to a stop, stopping a moving object within a relatively short distance of travel and within a limited space while imposing a low deceleration force to the object, and minimizing damage to the object during arrestment, and which can be used with aircraft that have tracking or pusher propellers, is relatively inexpensive, is portable, is capable of arresting aircraft and other objects over land or sea, and has a short set-up time requiring minimal personnel.

Still other objects of the present invention are to provide an aircraft recovery system and method capable of capturing flying aircraft or other vehicle or object, and bringing it to a halt with only limited travel of the aircraft following capture but without damage to the aircraft or any contents.

Still further objects of the present invention are to provide apparatus capable of securely engaging a parachute or similar device, and capable of preventing such devices from falling off the apparatus after engagement.

Briefly, these and other objects of the present invention are accomplished by an engaging device, such as a boom or other member provided with perpendicular extensions, which is capable of engaging and capturing a flying aircraft or a moving vehicle or some other moving object, as may be desired. The engaging device is connected to a support so as to permit movement of the device relative to the support in first and second different intersecting planes. The engaging device is restrained from motion in the first plane by a releasable holding device, such as a shear pin, which is configured to release the engaging device upon experiencing loading of at least a predetermined value. When engagement of the moving object is accomplished by the engaging device, the kinetic energy of the object causes release by the releasable device; if the first member is appropriately positioned and oriented with respect to the direction of movement of the moving object, then the weight of the object can cause or assist release by the releasable device, as may be desired. The engaging device then moves in the first plane towards the object so as to be near or on the same plane or line of action as that of the forward movement of the object immediately following capture. This change in the position of the engaging device minimizes the presence of any moment arm or force couple between the engaging device and the object, thus preventing any swinging or pendulation of the object about the engaging device. Forward motion of the object, with the engaging device, in the second plane following engagement can be resisted by an energy absorber such as a braking device connected to the support, if desired. The presence of the releasable device, and of the energy absorber if desired, reduces the amount of travel of the moving object with respect to the support which is necessary to accomplish halting of the moving object.

Other objects, advantages and novel features of the invention will become apparent from the following detailed description of the invention when considered in conjunction with the accompanying drawings wherein:

BRIEF DESCRIPTION OF THE DRAWINGS

FIG. 5 shows one example of the relative positions of the aircraft and the system of FIG. 1 during final approach of the aircraft to the system;

FIG. 6 shows the relative positions of the aircraft and the system of FIG. 1 upon capture of the aircraft by the system;

FIG. 7 shows the aircraft and system of FIG. 1 in a stage of operation subsequent to that of FIG. 6; and FIG. 8 shows the aircraft and system of FIG. 1 in a stage of operation subsequent to that of FIG. 7 with the aircraft brought to a halt.

DESCRIPTION OF THE PREFERRED EMBODIMENT

Figure 1:
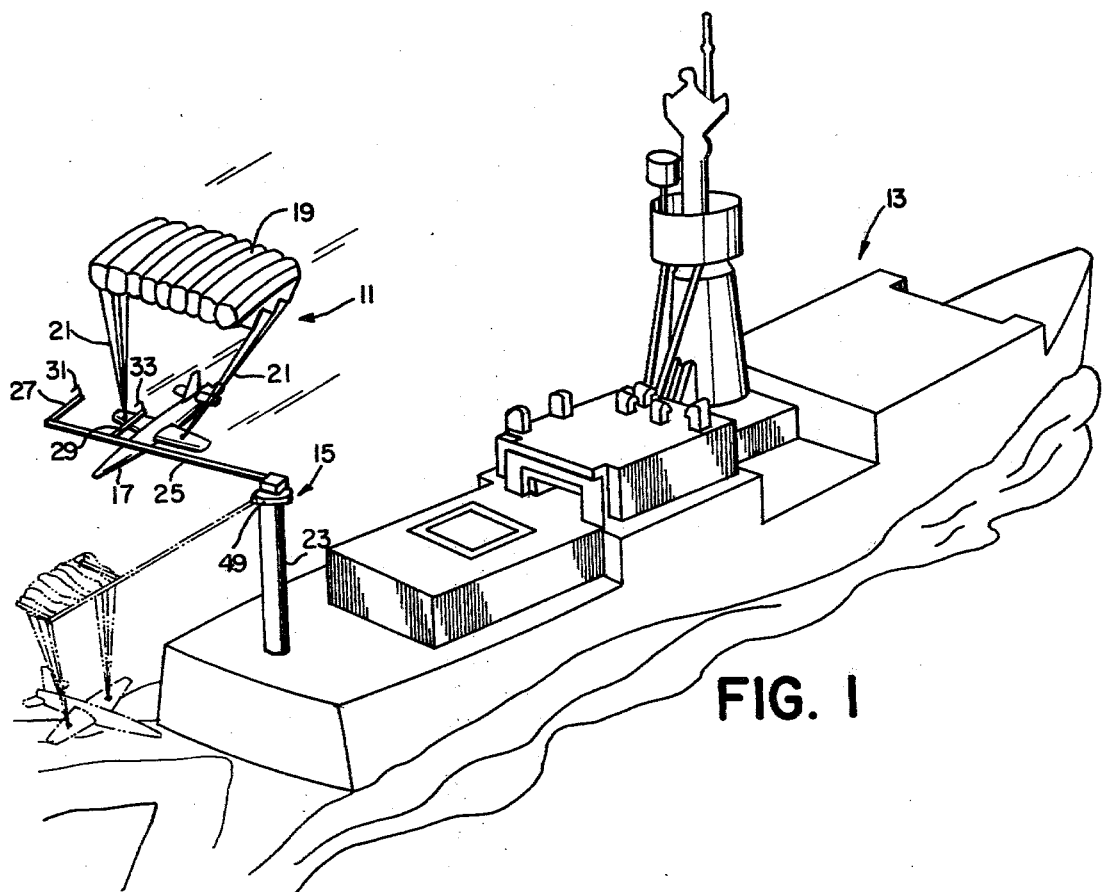
FIG. 1 shows, in respective solid and skeleton views, one embodiment of an aircraft approaching and arrested by a preferred embodiment of an arrestment system according to the prevent invention which is mounted on a ship disposed on the surface of a body of water.

Referring now to the drawings, wherein like reference characters designate like or corresponding parts throughout the several views, there is shown in FIG. 1 an aircraft 11 in flight approaching a water-borne ship or other water craft 13 for capture and arrestment by arrestment system or apparatus 15 disposed on, extending from, connected to and supported by the ship. Aircraft 11 approaching ship 13 and system 15 thereon is shown in solid lines; the relative positions of system 15 and aircraft 11 upon stopping of the aircraft for one example are shown in a skeleton view, indicating change in position of the aircraft and of the system during arrestment of the aircraft by the system. Aircraft 11 includes an aircraft body 17 flown suspended under and supported by parafoil 19. Aircraft 11 can for example be a remotely piloted vehicle. Parafoil 19 can for example be deployed from aircraft 11 during flight, or can provide lift for the aircraft during its entire flight, as desired. Parafoil 19 is a square, multicell, ram air inflatable, fabric device having an airfoil-shaped surface and capable of providing lift to a cargo. Parafoil 19 can for example be the device sold under the trademark "STRATO-CLOUD" By Para-Flite, Incorporated, Pennsauken, New Jersey and described in *Strato-Cloud Flight Manual,* copyright 1974 by Para-Flite, Inc. Parafoil 19 is connected to aircraft body 17 by a plurality of lines or shrouds 21. Arrestment system 15 can for example be mounted on support 23, which can for example be a mast or pole or other suitable support structure. System 15 includes a boom or pole 25 initially extending preferably substantially perpendicular to support 23. Extending perpendicularly from boom 25 are arresting spears or rods or projections 27 and 29, each of which is provided with a respective hook 31 or 33 at its end distant boom 25 to better retain parafoil 19 upon capture, especially to prevent parafoil 19 from slipping off from boom 25 following capture. Boom 25 and spears 27 and 29 catch and retain parafoil 19 and prevent it from sliding off and away from system 15. Boom 25 can for example be twenty feet long, and engaging spears 27 and 29 can for example each be three feet long. Spears 27 and 29 can for example be coplanar and parallel to each other.

Figure 2:
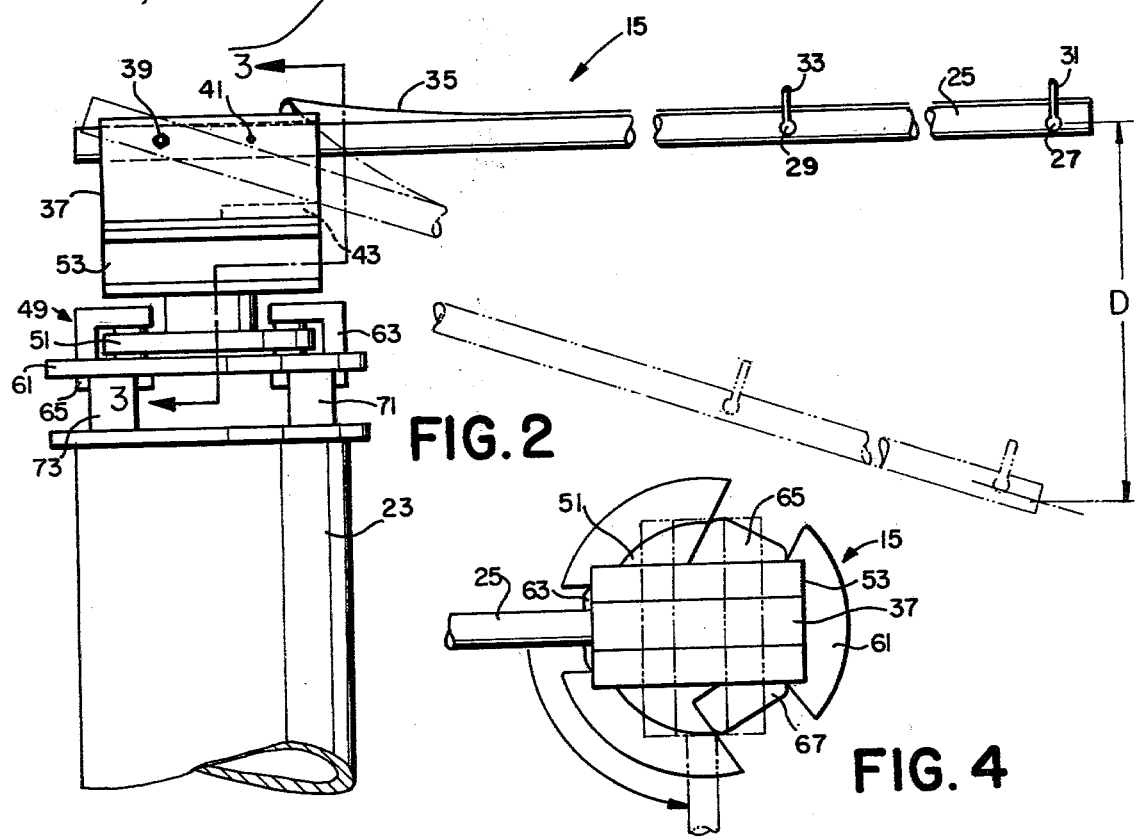
FIG. 2 is a side elevational view of the arrestment system of FIG. 1 and shows the system in greater detail.
Figure 4:
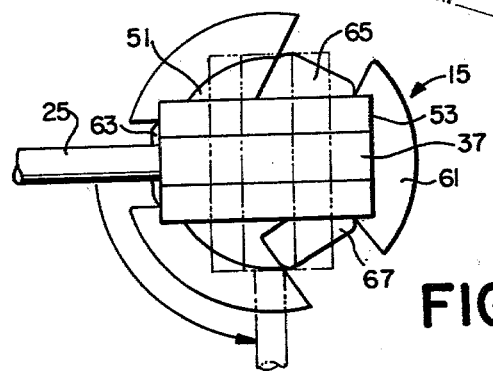
FIG. 4 is a plan view of a portion of the system of FIG. 2.
Figure 3:
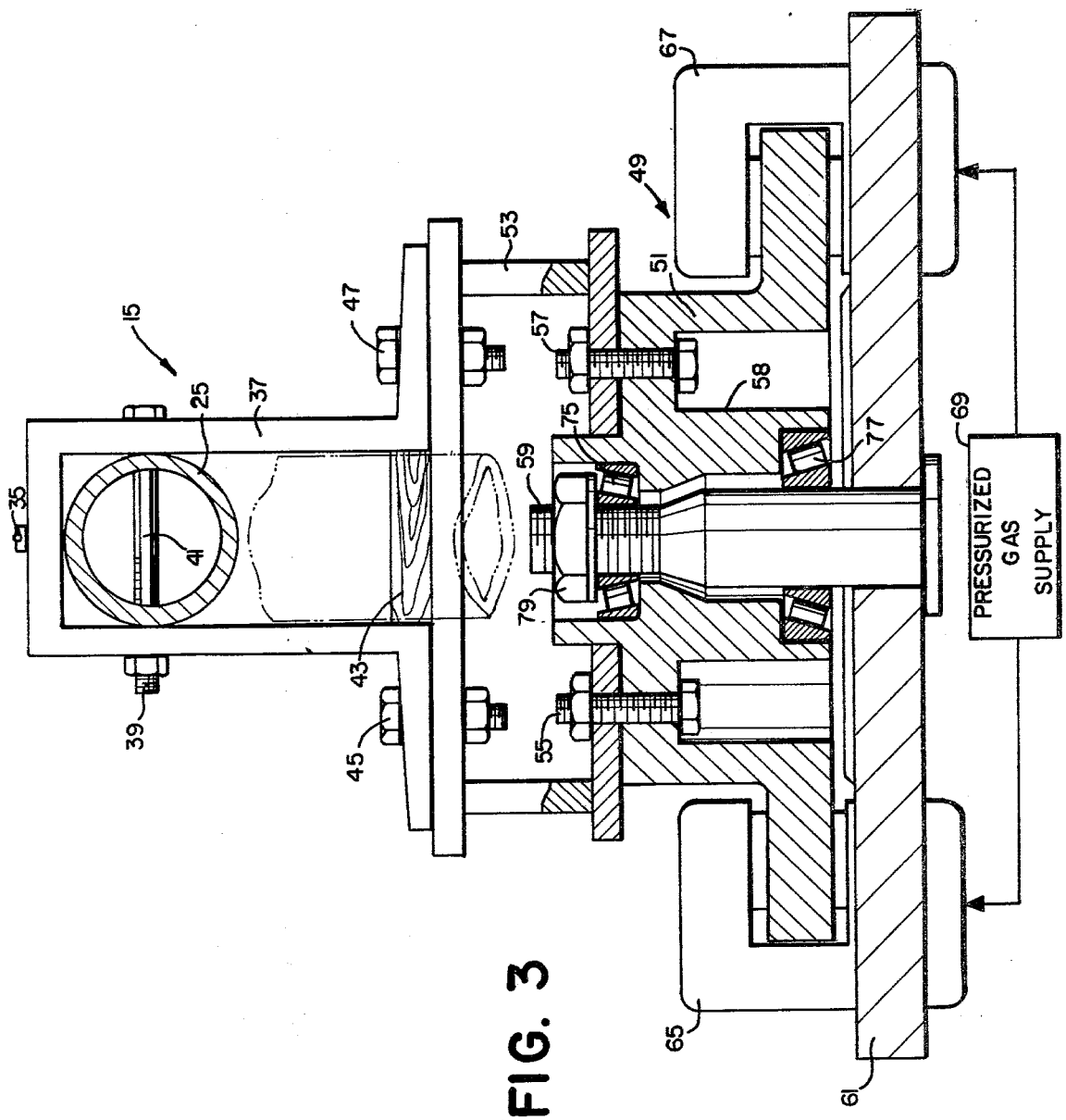
FIG. 3 is a section of the system taken on the line 3—3 of FIG. 2.

Arrestment system 15 is shown in greater detail in FIGS. 2-4. FIGS. 2 and 3 show boom 25 in solid and skeleton views indicating displacement of the boom during arrestment of aircraft 11 by system 15. FIG. 4 shows boom 25 and box 37 in solid and skeleton views indicating displacement of the boom and the box during arrestment of aircraft 11 by system 15. It is preferred that boom 25 be rigid in the vertical direction, yet flexible in the horizontal direction so that it can act like a spring to cushion or reduce the initial shock loading on support 23 resulting from capture of aircraft 11. Accordingly, boom 25 can for example be a metal tube vertically reinforced with a high strength cable 35 in the vertical direction which is connected to the top of open box or hollow cylinder 37, and can be connected to boom 25 by a series of clamps. Boom 25 is pivotally connected to box 37 by pivot or swivel pin 39 so that boom 25 can swivel or pivot about pin 39 vertically such as is shown in solid and skeleton views in FIGS. 2 and 3. Boom 25 is releasably supported, and prevented from so vertically pivoting, by shear pin 41 which is configured to break and release the boom at a predetermined load, allowing the boom to move vertically. Shear pin 41 permits boom 25 to drop towards the plane of motion or action of aircraft 11 upon capture of the aircraft to prevent pendulation or swinging of the aircraft about the boom. Shear pin 41 can for example be configured to break with a small additional force or loading beyond that provided by the weight of boom 25 and spears 27 and 29. When shear pin 41 is broken and boom 25 is vertically pivoted by captured aircraft 11, such vertical movement of boom 25 is limited by box 37, preferably by a cushioning pad or block 43 disposed in box 37 and which receives the impact resulting from dropping of boom 25 and distributes or prevents localized stresses at one point, thereby preventing kinks in or other damage to the boom. Pad 43 can for example be a block of wood or rubber. The dimensions of box 37 and pad 43 are preferably selected so that the distance D through which the outer engaging end of boom 25 drops in the vertical plane is equal to the distance separating aircraft body 17 and parafoil 19, determined by the length of lines 21. Boom 25 can be provided with a solid filler for support for the entire length of boom 25 disposed within box 37, particularly including that portion of the boom between swivel pin 39 and the portion of the boom striking pad or block 43 following release. The distance along boom 25 between swivel pin 39 and shear pin 41 can for example be ten inches. Box 37 is preferably rigid and is connected to be supported by support 23. Box 37 is connected such as by bolts 45 and 47 to energy absorber 49 which in turn rests upon, is connected to and is supported by support 23. Swivel pin 39 and energy absorber 49 enable the distal end of boom 25 to move with respect to support 23 in two different directions or planes. Energy absorber 49 includes brake disc 51, which can for example be of cast iron, which is rigidly connected to box 37 and thus to boom 25 by spacer box 53 and bolts 55 and 57, and is rotatably disposed about spindle 59 which is press fit into disc brake support plate or caliper plate 61. Bolts 55 and 57, and for example other bolts not shown, can be disposed in a circular groove or trench 58 in disc 51 which is concentric with disc 51. Boom 25, box 37, box 53 and disc 51 can rotate 360° in the horizontal plane while support 23 and disc brake support plate 61 connected thereto remain in a fixed position. Spacing box 53 is configured to provide a rigid connection between box 37 and disc 51, while leaving sufficient room for box 37 and disc 51 to turn about spindle 59. Energy absorber 49 furthermore includes brake calipers 63, 65 and 67 mounted on disc brake support 61 and powered by pressurized gas supply 69. Calipers 63, 65 and 67 are preferably provided with abrasive material such as molded asbestos where they engage disc 51. Calipers 63, 65 and 67 develop a braking force on boom 25, reacted upon by aircraft 11, to resist horizontally directed motion of the aircraft after capture. The system 15 can preferably be operated after selecting a brake pressure that will deplete the aircraft's 11 kinetic energy after boom 25 rotates about 90°, enabling the aircraft to avoid encountering any obstacles while applying a minimum deceleration load to the aircraft; however, any other angle can be selected for this purpose. Calipers 63, 65 and 67 can operate using compressed gas supplied by pressurized gas supply 69 via a conduit such as a flexible tube or pipe which leads from the calipers down the surface of support 23 to supply 69. Supply 69 can for example include a cylinder or tank containing air or nitrogen at 1000 psi or higher, an on-off valve for the cylinder, a gas pressure regulator inserted into the conduit and adjustable to 1000 psi to regulate the gas pressure in the conduit and thus at the calipers, and a manual bleed valve connected to the conduit between the regulator and the calipers 63, 65 and 67. Alternatively, calipers 63, 65 and 67 can be fluid actuated, for example by hydraulic fluid. Any number of calipers can be used, and are preferably disposed about support plate 61 at regular intervals. For example, if three calipers 63, 65 and 67 are utilized, they can be disposed on support plate 61 at 120° intervals. Support plate 61 can for example be circular with portions removed therein for mounting calipers 63, 65 and 67. Support plate 61 is fixed onto suppoert 23, by for example posts 71 and 73 and by a third post not shown. Disc 51 is rotatably connected to spindle 59 by roller bearings 75 and 77 which are adjusted by pressure applied thereto by nut 79 threadingly engaging spindle 59. For further information concerning energy absorbers such as brakes, see for example Banmeister, T. and Marks, L. S., Eds. *Standard Handbook for Mechanical Engineers,* 7th ed. (McGraw-Hill, N.Y. 1967) p. 8 –56 through 8–61, and *Airflex CA-10000: Technical Bulletin Covering the AIRFLEX 225DP100 Caliper Brake* By Eaton Power Transmission Systems, Eaton Corporation, Industrial Drives Division, Airflex Plant, Cleveland, Ohio.

Boom 25 can for example be of 2024-T3 aluminum. Reinforcing cable 35 can for example be 5000 lbs. breaking strength steel cable. Energy absorber 49 can for example have a piston area of 8.3 square inches, and its pad material can for example be of a molded asbestos composition. To stop an aircraft 11 traveling at 23 miles per hour (33.7 feet per second) with a 90° rotation within absorber 49, pressurized gas supply 69 should provide a gas pressure of 240 psi to calipers 63, 65 and 67. The length of lines 21, and of distance D, can for example be six or eight feet.

Operation of the foregoing embodiment of the present invention will now be described. FIGS. 5–8 pictorially illustrate the sequence of operation of system 15 from final approach of aircraft 11 to halting of the aircraft. Initially, aircraft 11 makes a final approach towards boom 25 and spears 27 and 29 mounted thereon, as shown in FIGS. 1 and 5. The aircraft is preferably flown towards boom 25 and maneuvered so that arresting spears 27 and 29 hook parafoil 19 in the lines 21 just under the parafoil canopy. As is shown in FIG. 6, arresting spears 27 and 29 and boom 25 then engage and capture lines 21, and aircraft body 17 while continuing to move forward past boom 25 thereby causes parafoil 19 to drop onto boom 25 and spears 27 and 29. When aircraft 11 arrives at and is engaged by boom 25, and thereafter moves therewith, it picks up the mass of the boom, so that by conservation of momentum, the velocity of the aircraft is reduced. Flying aircraft 11 then exerts force on boom 25 via lines 21. Since lines 21 are now at an angle to the perpendicular, there is a vertical component of this force. This "y-direction" component force, and the weight of aircraft 11, exert sufficient loading on shear pin 41 via boom 25 as to cause failing of shear pin 41 and subsequent dropping of boom 25 onto block 43, as is shown in FIG. 7 and in a skeleton view in FIG. 2. Shear pin 41 preferably breaks upon experiencing loading only slightly greater than that provided by boom 25 and spears 27 and 29 alone, so that the pin breaks, and the boom drops, quickly when aircraft 11 is engaged. Failure of shear pin 41 allows parafoil 19 and the engaging end of boom 25 to drop down in-line with the mass of aircraft 11, preventing the aircraft from pendulating about the boom. The distance D that the distal end of boom 25 thereby drops is preferably equal to the distance between parafoil 19 and aircraft body 17 in flight, determined by the length of lines 21, which distance is at or near the length of the moment arm between the engaging portion of boom 25 and the center of gravity of aircraft 11. As is shown in FIG. 7, once boom 25 drops, its distal end remains substantially in line with the forward motion of aircraft body 17. Thus, the forces exerted by energy absorber 49 via boom 25, and by aircraft 11, on each other are now directed on substantially the same line, preventing any moment arm or force couple therebetween, and thereby preventing or at least substantially reducing any swinging or pendulation of aircraft body 17 about boom 25 that would otherwise result. The portion of boom 25 engaging aircraft 11 is limited in the horizontal direction by boom 25 and energy absorber 49 to revolving or revolutional motion with aircraft 11 about support structure 23. Such pivoting confines all post-engagement travel of aircraft 11 to be within a limited space. As boom 25 thus turns about support structure 23 in the relatively horizontal direction as shown in FIGS. 4, 7 and 8, boxes 37 and 53 and disc 51 turn with it. As boom 25 so turns, it counteracts the energy absorber 49 torque. Energy absorber 49 through boom 25 imparts a constant force on the aircraft 11 throughout its revolution, resulting in a constant deceleration loading being imparted to aircraft 11. As this revolving motion of aircraft 11 and pivoting motion of boom 25 continues, energy absorber 49 absorbs the kinetic energy of aircraft 11, thereby slowing it. When energy absorber 49 dissipates all of the kinetic energy of aircraft 11, the arrestment of the aircraft is completed. Calipers 63, 65 and 67 can be adjusted to stop aircraft 11 within any amount of revolution desired, with an accompanying change of deceleration load. Stopping of aircraft 11 can take place within 90° of rotation of energy absorber 49 and boom 25 therewith such as is shown in FIGS. 1, 4 and 8. FIG. 8 shows the final configuration, with halted aircraft 11 hanging from boom 25.

When an aircraft in flight is engaged, captured and slowed by structure designed to place a restraining force on the aircraft during arrestment, and the structure and the aircraft are connected but separated by a link by a nonzero distance d, then the aircraft will swing about that structure upwardly through an angle $\theta$, where:

$$\theta = \cos^{-1}\left[\frac{m_1 v_1^2}{2gd(m_1 + m_2)} + 1 - \left(\frac{v_1^2}{2gd}\right)\right]$$

for $\theta \leq 180°$ and where $m_1$ is the mass of the aircraft, $m_2$ is the mass of the restraining structure, and $v_1$ is the velocity of the aircraft at capture. Thus, if boom 25 were not provided with the shear pin nor with a (preferably rapid) vertical change in position, but would only pivot in a single plane about support 23, then aircraft 11 would upon capture swing upwarding about the boom against gravity through an angle $\theta$. Also, the angle of swing $\theta$ is directly proportional to $v_1$. The length d of the resulting moment arm can for example be the distance between the center of gravity of aircraft 11 and the point of connection of the aircraft to boom 25 at which point the forces generated by the aircraft can be considered as being applied to the boom.

It should be understood that the present invention can be utilized to arrest any moving object provided with a decelerator or parachute, whether that decelerator or parachute be a standard curved closed-top parachute, a drogue, a parafoil, or some other device. Furthermore, the present invention can be utilized to engage any aircraft, and not merely those provided with parachutes. Examples of structure which can be utilized to engage other aricraft can be found in U.S. Pat. No. 1,756,747 to L. Holland for "Aeroplane Landing Means" and in U.S. Pat. No. 1,748,663 to E. F. Tucker for "Method and Means for Landing and Launching Aircraft and Aircraft Freight". A noose, net or claw could be utilized to engage other aircraft, vehicles, or moving objects. The dimensions of boom 25, box 37 and pad 43 can be selected for any desired boom drop D. Also, movement, while engaged, of the aircraft in a straight line in each plane of movement, instead of revolving movement about support 23, can be accomplished. For example, other embodiments of the present invention can include a boom or other member ridged or grooved and fitted at one or both ends to slidably engage a slot of limited or adjustable length formed in one or two supports disposed within the first plane. The entire member, and the aircraft, can then move in a straight line in the first plane. To then enable movement in a second plane, a single such slotted support could be rotatably connected to some support structure; a pair of such slotted supports could be rigidly connected together and slidably engage a track such as with rollers to enable movement in a straight line in the second plane. A shear pin or pins or some other releasable holding device could limit or prevent movement of the member in the slot(s) until the aircraft or other object is engaged, and the length of the slot, or a stop or detent disposed therein, could limit movement of the member in the first plane thereafter. An extension-type or compression-type shock absorber could be connected between the support(s) and the track or other support structure to absorb the kinetic energy of the aircraft or other moving object while the support(s) travel(s) in the track. If no energy absorber is utilized in the present invention, then a lighter shear pin or a more easily releasing releasable holding device should be used. Some simultaneous movement in the first and second planes can occur. Other releasing devices than shear pin 41 can be utilized in the present invention. For example, shear pin 41 can be replaced by a rigid pin or member slidably disposed in and connecting boom 25 and box 37 and which is not intended to break. The rigid pin is connected to a motor or similar device which is actuated by a force or loading sensor connected to boom 25. When the sensor senses the additional weight, and thus the presence, of the aircraft 11 or other object on the engaging device upon engagement, the motor pulls the rigid pin out of and away from boom 25 or other engaging device. As another example, a (preferably) Pneumatic or a hydraulic cylinder-type shock absorber, provided with a pressure operated override solenoid or switch, could be connected between boom 25 and energy absorber 49. When the aircraft 11 or other object is engaged, the resulting additional load on the shock absorber and thus additional cylinder pressure therein triggers the switch to allow relief of cylinder pressure. Also, a proximity detector, photocell or other sensor can be used to detect the proximity of the aircraft 11 or other object to automatically release boom 25 and begin boom drop just before or during engagement. An appropriate time delay between such proximity sensing and completion of boom 25 drop can be provided to permit engagement of the aircraft before completion of the boom drop, if desired. However, it is preferred that the engaging device be released upon sensing engagement, to better minimize any moment arm between the engaging device and the moving object, and to provide a full arrestment window for the approaching aircraft or object.

Some of the many advantages of the present invention should not be readily apparent. For example, a novel arrestment system has been provided which is capable of preventing or reducing swinging or pendulation of an aircraft or other moving object about an engaging device. This is accomplished by a sharp, rapid movement of the engaging device to be more in-line with the center of gravity of the moving object engaged. For example, the engaging device can be so moved that the point at which the forces generated or applied by the moving object can be said to be applied to or react on the engaging device is within or near the plane of post-engagement motion of the aircraft, and any moment arm or force couple therebetween is effectively reduced or eliminated. The present invention is especially valuable where the engaging device and/or the moving object are configured so that there can be a moment arm present between the engaging device and the object. Frequently, such a moment arm can appear between the point of object attachment to the engaging device and the center of gravity of the object, for example by provision of a link connecting the device and object which is pivotally connected to the device and/or the object. In the preferred embodiment, shear pin 41 providing rapid release of boom 25 permits a sudden drop of boom 25 upon aircraft 11 capture to prevent such swinging or pendulation of the aircraft about the boom. By preventing or reducing such swinging or pendulation, the present invention enables reduction of the amount of travel of the moving object following engagement thereof which is necessary to accomplish arrestment, enabling such arrestment within limited spaces such as on board non-aviation ships. The rapid movement to prevent swinging of the object upon and following capture, particularly in combination with an energy absorber acting against subsequent travel of the moving object, enables arrestment of objects having higher speeds at engagement, and reduces the amount of subsequent travel of the object necessary for arrestment. The invention is capable of stopping a moving aircraft or other vehicle or object within a given distance while imposing a low deceleration force to it, is relatively inexpensive, can be portable, is relatively small, can be truck mounted for land arrestments, and has a short set-up time requiring a minimum of personnel. Boom 25 and spears 27 and 29 can engage aircraft having tracking or pusher propellers.

Obviously, many modifications and variations of the present invention are possible in light of the above teachings. It is therefore to be understood that, within the scope of the appended claims, the invention may be practiced otherwise than as specifically described.

What is claimed is:

1. Apparatus for arrestment on a vessel of an aircraft in flight having a parafoil connected to it by shroud lines from the body of the aircraft, comprising:
   support means formed to be uprightly mounted on the vessel;
   engaging means pivotally connected to said support means and radially extending therefrom for pivoting downwardly and about said support means upon capturing the shroud lines; and
   adjustable braking means operatively connected between said support means and said engaging means for providing a constant force for stopping the aircraft within a predetermined sector of pivoting of said engaging means about said support means.

2. Apparatus as recited in claim 1 wherein said engaging means further comprises:
   boom means pivotally connected to said support means;
   releasing means releasably connecting said boom means and said braking means for preventing until capture of the aircraft downward movement and pendulation of the aircraft about said boom means; and
   limiting means connecting to said braking means for limiting downward movement of said boom means to the plane of motion of the aircraft.

3. Apparatus as recited in claim 1 wherein said braking means further comprises:
   disc means connected to said engaging means for rotation therewith and rotatably connected to said support means; and
   caliper means mounted on said support means about said disc means for stopping the rotation of said disc means about said support means.

4. Apparatus as recited in claim 3 wherein said braking means further comprises:
   power means operatively connected to said caliper means for providing a predetermined brake force to delete the aircraft's kinetic energy within said predetermined sector of pivoting.

5. Apparatus as recited in claim 2 wherein said releasing means comprises:
   shearing means releasably connecting said boom means and said braking means for preventing until capture of the aircraft downward movement and pendulation of the aircraft about said boom means.

6. Apparatus for arrestment on a vessel of an aircraft in flight having a parafoil connected to it by shroud lines from the body of the aircraft, comprising:
   an upright support formed to be mounted on the stern deck of the vessel;
   an adjustable boom pivotally connected at one end to said support and laterally extending therefrom for pivoting downwardly and about said support upon capturing the shroud lines; and
   a brake operatively connected between said support and said boom for stopping the aircraft within a 90 degree sector of pivoting of said boom about said support.

7. Apparatus as recited in claim 5 wherein said engaging means further comprises:
   a shear pin releasably connecting said boom and to said brake for preventing until capture of the aircraft downward movement and pendulation of the aircraft about said boom; and
   a pad connected to said brake for limiting downward movement of said boom to the line of flight of the aircraft.

8. Apparatus as recited in claim 6 wherein said brake further comprises:
   a disc connected to said boom for rotation therewith and rotatably connected to said support means; and
   calipers mounted on said support about said disc for stopping the rotation of said disc about said support.

9. Apparatus as recited in claim 8 wherein said brake further comprises:
   a pressure source operatively connected to said calipers for providing a predetermined brake pressure to deplete the aircraft's kinetic energy within said 90 degree sector of pivoting.

* * * * *

UNITED STATES PATENT AND TRADEMARK OFFICE
CERTIFICATE OF CORRECTION

PATENT NO. : 4,311,290
DATED : January 19, 1982
INVENTOR(S) : Kenneth T. Koper

It is certified that error appears in the above-identified patent and that said Letters Patent are hereby corrected as shown below:

Column 10, line 14, delete "adjustable".

Column 10, line 18, before "brake" delete "a" and insert
-- an adjustable --.

Signed and Sealed this

Ninth Day of November 1982

[SEAL]

Attest:

GERALD J. MOSSINGHOFF

Attesting Officer   Commissioner of Patents and Trademarks